US008700890B2

(12) United States Patent  
Runkis et al.

(10) Patent No.: US 8,700,890 B2  
(45) Date of Patent: Apr. 15, 2014

(54) SECURE STORAGE AND ACCELERATED TRANSMISSION OF INFORMATION OVER COMMUNICATION NETWORKS

(75) Inventors: Walter H. Runkis, Ridgeland, MS (US); Donald E. Martin, Jacksonville, FL (US); Christopher D. Watkins, Orlando, FL (US)

(73) Assignee: Bitspray Corporation, Clinton, MS (US)

( * ) Notice: Subject to any disclaimer, the term of this patent is extended or adjusted under 35 U.S.C. 154(b) by 781 days.

(21) Appl. No.: 12/790,495

(22) Filed: May 28, 2010

(65) Prior Publication Data

US 2010/0306524 A1 Dec. 2, 2010

Related U.S. Application Data

(60) Provisional application No. 61/213,336, filed on May 29, 2009.

(51) Int. Cl.
*H04L 29/00* (2006.01)
(52) U.S. Cl.
USPC ............................... 713/150; 380/37; 341/51
(58) Field of Classification Search
USPC ................. 713/150; 714/38; 380/37; 341/51
See application file for complete search history.

(56) References Cited

U.S. PATENT DOCUMENTS

| | | | |
|---|---|---|---|
| 5,572,206 A * | 11/1996 | Miller et al. | 341/51 |
| 5,991,414 A | 11/1999 | Garay | |
| 6,192,472 B1 | 2/2001 | Garay | |
| 6,253,337 B1 * | 6/2001 | Maloney et al. | 714/38.14 |
| 8,009,830 B2 * | 8/2011 | Orsini et al. | 380/37 |

OTHER PUBLICATIONS

"Clearing the air on cloud computing", McKinsey & Company, pp. 1-33, Mar. 2009.
C. Tshudin et al., "Network Pointers," ACM SIGCOMM Computer Communications Review, vol. 33, No. 1, pp. 23-27, Jan. 2003, see chapter 2.

(Continued)

*Primary Examiner* — Brandon Hoffman
*Assistant Examiner* — Michael D Anderson
(74) *Attorney, Agent, or Firm* — DLA Piper LLP (US)

(57) ABSTRACT

A system and method for securely storing and transmitting digital information includes a computing device connected to at least one of a network device or a storage device or both. The system and method also includes a communication network connected to the at least one of a network device or the at least one of a storage device, or both. The system and method may include the computing device being configured to receive and receiving at least a portion of one or more first bit streams from an input device, being configured to parse and parsing the at least a portion of the one or more bit streams to form one or more first datasets, being configured to compress and compressing the one or more first datasets to form one or more second datasets, being configured to encrypt and cryptographically modifying the one or more second data sets to form one or more third datasets, being configured to assemble and assembling the one or more third datasets to form at least one second bit stream; and being configured to disperse and dispersing the at least one second bit stream into multiple portions in such a manner that any minimum number of the total number of dispersed portions contains a complete second bit stream, and being configured to output and outputting the total number of dispersed portions to one or more of local and remote data storage devices.

49 Claims, 4 Drawing Sheets

(56) References Cited

OTHER PUBLICATIONS

A. Harrington et al., "Cryptographic Access Control in a Distributed File System," SACMAT'03, pp. 158-165, Jun. 3, 2003, See Chapter 3: figure 2.

S. Pearson, "Taking Account of Privacy when Designing Cloud Computing Services," Proceedings of the 2009 ICSE Workshop on Software Engineering Challenges of Cloud Computing, pp. 44-52, May 23, 2009, see chapter 5.

G. Ateniese, et al., "Improved Poxy-Re-encryption Schemes with Applications to Secure Distributed Storage," ACM Transactions on Information and System Security, vol. 9, No. 1, pp. 1-30, see chapter 3, Feb. 2005.

International Search Report and Written Opinion issued in PCT/US2010/036703 on Apr. 27, 2010.

* cited by examiner

SECURE STORAGE AND ACCELERATED TRANSMISSION OF INFORMATION OVER COMMUNICATION NETWORKS

This application is based on and derives the benefit of the filing date of U.S. provisional patent application No. 61/213,336, filed May 29, 2009, the contents of the entirety of which are incorporated herein by reference.

FIELD

The present disclosure is directed to the field of storage and transmission of information over communication networks and, more particularly, towards systems and methods for securely storing and transmitting information over communication networks and accelerating information transmission rates.

DETAILED DESCRIPTION OF SEVERAL EMBODIMENTS

In general, this disclosure is directed to systems and methods for securely transmitting, storing, and increasing the transmission rates of digital information. Digital information may include information transmitted across any communication network. Communication networks may include, for example, data networks such as a LAN (Local Area Network), MAN (Metropolitan Area Network), WAN (Wide Area Network), cellular networks, power line networks, satellite link networks, or any combination thereof. Furthermore, the transmission medium for such networks may be wired or wireless. The information itself may represent voice information, data information, multimedia information, or any other such information capable of being transmitted across a communication network. As discussed below, the present disclosure may be implemented as a software program, a hardware device, or any combination thereof.

At a high level, this disclosure is directed to at least one software program running on one or more computing devices. The software program implements an algorithm that provides an end-to-end information storage and transmission solution that acts upon digital information by parsing the information into a plurality of datasets, compressing the datasets, and rendering the datasets indecipherable to unauthorized use. In addition, the program may separate the datasets into data blocks that are dispersed in a deterministic or nondeterministic manner to produce one or more modified data streams or datasets. These datasets are stored in a plurality of local and/or remote locations on volatile or nonvolatile storage media, or transmitted over a wired or wireless network. The one or more modified data streams or datasets are always maintained in a highly compressed state which is indecipherable to unauthorized use.

The term "deterministic" as used herein may mean to systematically predetermine the characteristics for disassembling and/or dispersing data. For instance, information may be disassembled into bits, nibbles, bytes, or larger size data blocks depending upon the data type such as, for example, ASCII text or a video stream, or device control information, or a program or program segment such as a code block. The disassembly may also be performed to enhance compression techniques or to enhance encryptions techniques, and the like, as described elsewhere in this disclosure. Alternatively, information may be dissembled and dispersed in such a manner as to enhance network transmission modalities, transmission rates, or to accommodate different storage conditions. For example, data may be stored in a SAN (Storage Attached Networks) or NAS (Network Attached Storage) configuration as opposed to being stored in stand alone devices such as smart phones. In another embodiment, information may be dissembled and dispersed in a manner so as to overcome technical difficulties or various constraints such as, for example, those which attenuate electrical interference in broadband over powerline networks or atmospheric disturbances in wireless networks, or those affecting military and police ad hoc radio and other such data transmissions where not all communications devices are expected to be online at the same time. In alternative embodiments, other such contingencies may arise from time to time which may require the deterministic dispersal of data blocks.

The term "non-deterministic" as used herein may apply to a procedure for disassembling and/or dispersing data as bits, bytes, nibbles, or data blocks of various sizes in a pseudorandom manner such as, for example, by generating a random number and associating the disassembled data with the alphanumeric sequence of the random number. Non-deterministic disassembly and dispersion may also be deterministically applied as a natural result of some mechanism or algorithm which may accomplish the tasks of disassembly and/or dispersion of data without the use of a random number. While the decision to use a process or procedure may be truly non-deterministic (random), all operations that modify the original data by a process or procedure may be deterministic in nature for the structural integrity of the original data to be preserved when those processes are reversed.

The term "blocks" as used herein may mean groups of bits, nibbles, and/or bytes which can be of uniform size such as, for example, 16 bytes each, or they can be of non-uniform size.

Because the information processed by the disclosed techniques may be maintained in a compressed state, this compressed information can be bi-directionally transmitted at data transmission rates that are substantially greater than the maximum data transmission rate that is normally predicted by theorems, such as, for example, the Shannon-Hartley theorem, for a given network or network segment while always remaining indecipherable to unauthorized use.

The disclosure may be implemented in software, hardware or both. In an embodiment, the disclosure may be implemented in the form of software embodying an algorithm consistent with the present disclosure. Furthermore, the algorithm may be configured to function on all types of wired networks using different transmission media such as, for example, coaxial cable, fiber optic cable, power lines, and all types of wireless networks operating at different frequencies based on the type of transmission standards used. In addition to being transmission-medium agnostic as discussed above, the algorithm is also communication protocol agnostic meaning that it can be implemented on a communication network using any communication protocol or standard such as, for example. IP, Decnet, AppleTalk, Ethernet on a data network, GSM, or CDMA on a cellular network, or any other such protocol or standard.

Figure 1:
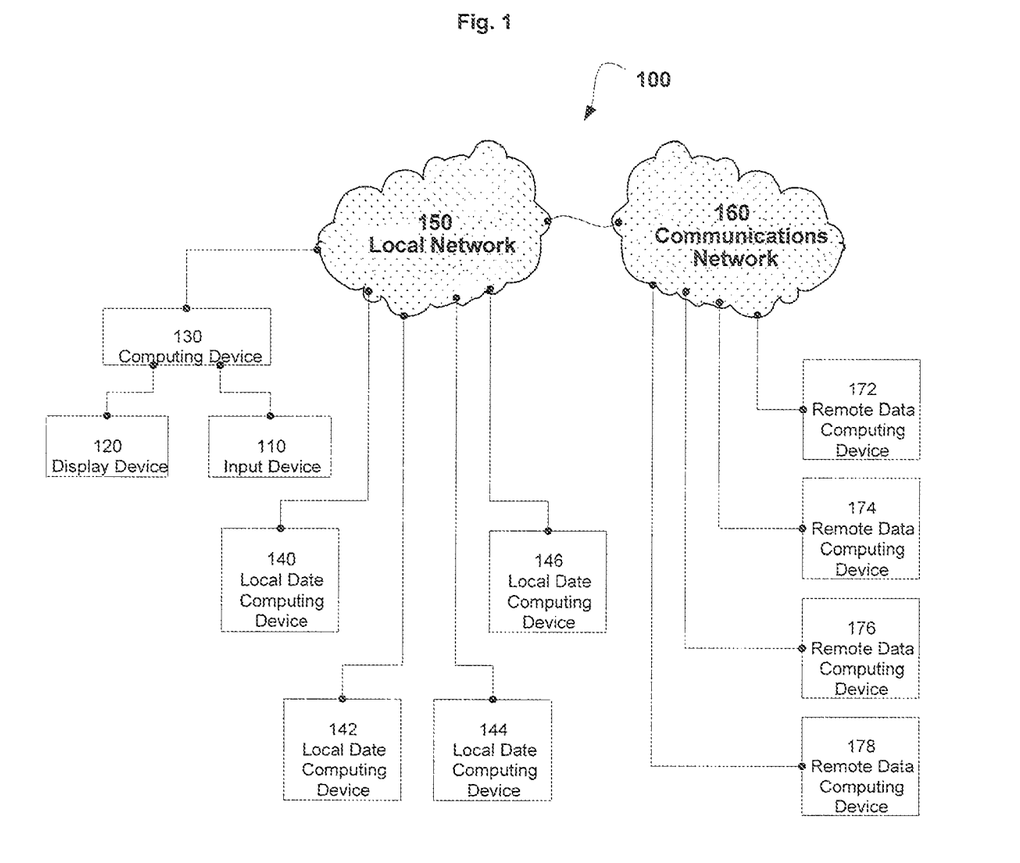
FIG. 1 is a schematic diagram representation of a system 100 for securely transmitting and storing information according to a disclosed embodiment.

FIG. 1 provides a schematic representation of a system 100 for securely transmitting and storing information according a disclosed embodiment. System 100 includes an input device 110, a display device 120, a computing device 130, local data computing devices 140, 142, 144, and 146, a local network 150, a communication network 160, and remote data computing devices 172, 174, 176, and 178.

Generally, computing device 130 is configured to receive data from input device 110 or from local network 150. This data may be received in the form of one or more bit streams. Computing device 130 may also be configured to parse the received data into one or more first datasets and compress the one or more first datasets to form one or more second datasets. In addition, computing device 130 may also encrypt the one or more second datasets to form one or more third datasets. Furthermore, computing device 130 may also assemble the one or more third datasets to form at least one second bit stream. This second bit stream may be output to one or more of local computing devices 140, 142, 144, and 146 and/or one or more of remote computing devices 172, 174, 176, and 178 via local network 150 and/or communication network 160. In addition, or alternatively, computing device 110 may disassemble the one or more third datasets into multiple data blocks so as to form "t" volumes. In particular, one or more blocks may be part of a volume.

Furthermore, the formation of "t" volumes occurs in such a manner that "m" out of "t" volumes contain a complete data set, wherein "m"<"t." Computing device 110 may also be configured to disperse the "t" volumes through local network 150 and/or communication network 160 such that the "t" volumes are stored over any combination of local computing devices 140, 142, 144, and 146 and/or one or more of remote computing devices 172, 174, 176, and 178, the end result being that no single computing device stores a complete dataset. The terms "t" and "m" are used to merely describe a feature of the disclosure and should not be considered limiting in any manner.

Input device 110 may be any device that allows a user to input data into computing device 130. This may include, for example, a workstation keyboard, a laptop keyboard, a keyboard for a smart phone, a mouse, or software that recognizes voice commands and converts the commands into a format readable by computing device 130. Display 120 may include, for example, a workstation monitor, a laptop monitor, or a monitor physically integrated with a key board such as, for example, that of a smart phone or a laptop. Input device 110 may be connected to display device 130 in multiple ways. For example, in an embodiment such as a workstation input device 110 may communicate via computing device 130 through a wired or wireless connection. On the other hand, input device 110, display device 120, and computing device 130 may be physically integrated onto one chassis to form a laptop, a smart phone or any other such device.

Computing device 130 may include any device that processes data and stores and/or transmits the data. For example, computing device may include a workstation, a laptop, a server, a smart phone, or any other such device that can execute a software program that processes, stores, and/or transmits information according to disclosed embodiments. Computing device 130 may include a port to receive data for processing from input device 110 and a port to receive data for processing from local network 150. These ports may be a USB port, a cat5 port, a coaxial port, a fiber port, or any other such port capable of receiving digital data.

Computing device 130 may connect to one or more local computing devices 140, 142, 144, and 146 via a local network 150. Local computing devices 140, 142, 144, and 146 may be similar to computing device 130 in that they have the ability to process and store/and transmit data. At minimum, local computing devices 140, 142, 144, and 146 are configurable to securely store data. Local network 150 may be a wired or wireless local area network ("LAN") that includes network devices such as, for example, hubs, switches, routers, and other equipment that may be used to operate a LAN. In an embodiment, local network may be a home network, an office network, or a home office network or any other network that would connects computing devices locally.

Furthermore, the physical medium transmitting information through local network 150 may be fiber optic cables, coaxial cables, cat5 cables, power lines using broadband over power line technology, or any other wired medium capable of transmitting data. In an alternative embodiment, local network 150 may be a wireless data network or a cellular network that is capable of transmitting data. While local network 150 may be a local area network, one of skill in the art will appreciate that in an alternative embodiment, local network 150 may also be a Metropolitan Area Network ("MAN") and would also be consistent with the scope of this disclosure.

Remote computing devices 172, 174, 176, and 178 may be similar to computing device 130, and local computing devices 140, 142, 144, and 146, in that they also have the ability to store and transmit data, and, at a minimum are configurable to securely store data. Each computing device discussed above may include a central processing unit ("CPU") (not shown), Random Access Memory ("RAM") (not shown), Read Only Memory ("ROM") (not shown), non-volatile memory (not shown), and volatile memory (not shown). Furthermore, each of these components may be mounted on the same physical chassis or distributed across multiple chassis without departing from the scope of this disclosure.

Local network 150 may connect to communication network 160 through a wired or wireless connection. In an embodiment, communication network 160 may be the Internet or any other wide area network such as, for example, a private intranet such as one owned by the Defense Information Systems Agency ("DISA"), the US Navy's WAN called Smartlink or any other such network.

In an embodiment, computing device 130 may include a controller configurable to perform data compression, encryption, and dispersion. The controller may include components necessary to perform the above-mentioned features. These may include, for example, at least a portion of a control processing unit configured to execute software instructions that may perform these features, at least a portion of one or more memory units that store these software instructions, and any other components necessary to perform the above-mentioned features. While the disclosed embodiment discusses the features of data compression, encryption; and dispersion being accomplished in software alone, one skilled in the art will appreciate that in an alternative embodiment, the above-mentioned features may be accomplished in hardware only by use of specialized hardware such as one or more Application Specific Integrated Circuits (ASICs), or off-the-shelf hardware without departing from the scope of this disclosure. In yet another embodiment, the above-mentioned features may be performed by a combination of hardware and software.

In an embodiment, a controller on computing device 130 is configured to receive data from input device 110. This data may be in the form of one or more bit streams. The controller may also be configured to buffer the received data. In addition, the controller may also be configured to parse the one or more received and buffered bit streams into one or more first datasets. In an embodiment, the portion of the controller that performs this parsing function may be a parsing module which, as discussed above, may be software instructions that perform the parsing, one or more hardware components that perform the parsing, or a combination of both. A dataset, as used in this disclosure, may be of fixed size, i.e., include a fixed number of bits, or may be of variable size, i.e., include a variable number of bits up to a maximum number of bits. In an embodiment, the parsing module may be a software component, a hardware component, or any combination thereof, that receives digital information as a bit stream if data is in motion or alternatively convert digital information into a bit stream if data is at rest. The type of parsing done by the parsing module may depend on the downstream processing of the digital information contemplated by computing device 130. For example, the parsing may be done differently for data that needs to be dispersed as opposed to data that does not need to be dispersed. Alternatively, data that will be dispersed deterministically may be parsed differently than data that will be dispersed non-deterministically. In an embodiment, the bit stream may be separated according to a mathematical formula into bits, nibbles, bytes or blocks of bytes of uniform or varying sizes. These resulting parsed datasets may be used as building blocks by various information dispersal algorithms such as Michael O'Rabin's algorithmic implementation of Adi Shamir's Secret Sharing Scheme. In addition, after the bit stream is parsed into one or more first datasets, these datasets may be written to a memory buffer or if necessary to a disk swap file if virtual memory is activated.

In addition to parsing, the controller in computing device 130 may also overwrite one or more memory locations holding the one or more original bit streams with a random or non-random data pattern. This overwriting may be done to ensure that no one has access to the original bit stream, thereby enhancing the security of data in system 100. In an embodiment, after the parsing module processes the bit stream into one or more first datasets, a complimentary method running in a separate thread may overwrite any file space occupied by the bit stream using a scrub algorithm that repeatedly writes a random or non-random data pattern to each memory location to deep clean the memory space or swap file space occupied by the bit stream.

The controller in computing device 130 may also be configured to compress the one or more first datasets to form one or more second datasets. In an embodiment, the portion of the controller that performs this compression function may be a compressing module which, as discussed above, may be software instructions that perform the compressing, one or more hardware components that perform the compressing, or a combination of both. In an embodiment, the compressing module may be a software component, a hardware component, or any combination thereof, including a pool of data compression utilities. The compressing module may select algorithms or various features contained within a single algorithm to accommodate an individual data need. Some of the compressing algorithms that may be used by the compressing module include LZ77, PAQ8PX, and LZMA(1). Furthermore, different compressing algorithms may be selected for providing the compression feature for different types of data. For example, if the data to be processed is in the form of text and/or PDF files, the compressing module may select the LZ77 algorithm for compressing such data. On the other hand, the compressing module may select the PAQ8PX algorithm for compressing data in the form of word documents, excel files, or bitmap files. In addition, the LZMA(1) algorithm may be selected to compress data in the form of image files or xls files.

In an embodiment, where information is being processed as a file, the selection may be accomplished by extracting the file type from the filename, or by opening the file and extracting the metadata in the file header that describes the type of data included in the file. The compressing module may then apply the appropriate algorithm known to have utility for compressing such data. The controller in computing device 130 may also determine from extracting the file type or header metadata that the file has already been compressed, or is not deemed compressible and, therefore, may skip the compression step.

In an embodiment, if the parsed dataset is small enough, the parsed dataset may be compressed as a single dataset. Alternatively, if the parsed datasets are larger, then the parsed dataset may be separated into smaller data subsets which may be compressed individually.

The controller in computing device 130 may also be configured to cryptographically modify the one or more second datasets to form one or more third datasets. In an embodiment, the portion of the controller that performs this encryption function may be an encryption module which, as discussed above, may be software instructions that perform the encryption, one or more hardware components that perform the encryption, or a combination of both. In an embodiment, the encryption module may encrypt data using any one, or a combination, of known encryption algorithms such as, for example, AES-256, 3DES, or Two Fish. Furthermore, data may be encrypted more than once using different encryption algorithms each time. For example, data may first be encrypted with AES-256 and then re-encrypted with 3DES, or any other encryption algorithm. Each of the encryption algorithms used by the encryption module may modify the one or more datasets in such a manner as to render the information included in the datasets indecipherable to unauthorized use. One of skill in the art will appreciate that in an embodiment, the parsing, compression, encryption, and dispersion modules may be part of one single algorithm incorporating all these functionalities.

In addition, in an embodiment consistent with the present disclosure, the controller in computing device 130 may assemble the one or more third datasets to form at least one second bit stream. This second bit stream contains information that in essence is identical to that of the original first bit stream received from input device 110, but which has now been parsed, compressed, and encrypted, thereby rendering it indecipherable to unauthorized use. The controller in computing device 130 may be configured to output this second bit stream to any combination of local devices 140, 142, 144, and 146 and remote computing devices 172, 174, 176, and 178 via local network 150 and/or communication network 160.

The transport mechanism used by computing device 130 to output the second bit stream may depend on the type of connectivity between computing device 130 and the local devices 140, 142, 144, and 146 and remote computing devices 172, 174, 176, and 178. For example, in an embodiment, if computing device 130 connects to local computing devices 140, 142, 144, and 146 via local network ISO which is an Ethernet network, then computing device 130 may output the second bit stream as Ethernet frames at the datalink layer. In addition, if in an embodiment computing device 130 connects to remote computing devices 172, 174, 176, and 178 via communication network 160 in addition to local network 150, where communication network 160 is a TCP/IP network, then computing device 130 may output the second bit stream as TCP/IP frames at the network and transport layer. Furthermore, local computing devices 140, 142, 144, and 146 and/or remote computing devices 172, 174, 176, and 178 may store the second bit stream in any memory unit configurable to hold such data. Furthermore, computing device 130, local computing devices 140, 142, 144, and remote computing devices 172, 174, 176, and 178 may each include a networking component (not shown) that connects the computing device to local network 150 or communication network 160 such as, for example, an Ethernet card.

In an alternative embodiment, the controller in computing device 130 may disassemble the one or more third datasets into multiple data blocks so as to form "t" volumes or "t" data streams as part of at least one second bit stream. In particular, one or more blocks may be part of a volume. Similar to datasets, a data block may be of a fixed size, i.e., hold a fixed number of bits or of variable size and, as such, can be configured in any manner suitable to one of skill in the art without departing from the scope of this disclosure. A volume may also be configured to hold one or more data blocks and, as such, its size is also configurable by one of skill in the art without departing from the scope of this disclosure. In addition, the formation of "t" volumes occurs in such a manner that "m" out of "t" volumes contain a complete dataset, wherein "m"<"t." The values of "t" and "m" are selectable by a user of the techniques consistent with the present disclosure.

Thus, for example, a user may decide to use techniques consistent with the present disclosure to modify an original bit stream into at least one second bit stream that has 8 volumes such that 2 out of those 8 volumes contain a complete dataset. On the other hand, a user may decide to use techniques consistent with the present disclosure to modify an original bit stream into at least one second bit stream that has 4 volumes such that 2 out of those 4 volumes contain a complete dataset.

In addition, the controller in computing device 130 may also be configured to disperse the "t" volumes through local network 150 and/or communication network 160 such that the "t" volumes are stored over any combination of local computing devices 140, 142, 144, and 146 and/or one or more of remote computing devices 172, 174, 176, and 178, the end result being that no single computing device stores a complete dataset. Thus, for example, if a user decides to modify an original bit stream into at least one second bit stream that has 8 volumes ("t"=8) such that 2 out of those 8 volumes contain a complete dataset ("m" 2), then the 8 volumes may be distributed across the local computing devices 140, 142, 144, and 146 and the remote computing devices 172, 174, 176, and 178 in a random or pseudorandom manner. Furthermore, in system 100, because t=8 and m=2, any 6 volumes (which may also be considered as 6 second data streams) can be destroyed and the two remaining volumes (or two remaining data streams) would contain a complete dataset. The six remaining volumes can subsequently be reconstructed at alternate locations without any loss of information integrity. This further increases information security because no complete dataset is ever stored in a single computing device. Data transmitted and stored in such a manner may persist in a state of high availability across a network of any size As discussed above, the numbers 8 and 2, as used above are for example purposes only and do not limit the scope of the present disclosure.

In an embodiment, the feature of disassembling the third datasets into multiple data blocks and dispersing the data blocks in the manner described above may be performed by a dispersing module in computing device 130. The dispersing module may be a software component, a hardware component, or any combination thereof in computing device 130. In an embodiment, the dispersing module may use an information dispersal algorithm according to a known process such as, for example, Adi Schamir's Secret Sharing Scheme.

One skilled in the art will appreciate that the number of local and remote computing devices used as storage locations depicted in FIG. 1 is for illustrative purposes only. That is, any number of computing devices used as storage locations may be present in a system utilizing techniques consistent with the present disclosure, and the locations of where volumes are sent may change constantly. For example, if there are 1000 computing devices located in, for example, federal post offices, configurable to store 8 "t" volumes, whereby m=4 of the 8 volumes hold a complete dataset created by computing device 130, then the controller may choose any 8 out of the 1000 computing devices to store the 8 volumes in a random or pseudorandom manner such that no one, not even an authorized user of system 100, may know which of the 1000 computing devices store the 8 volumes.

Moreover, in an embodiment, every time a user saves a dataset, such as after editing it, a computing device may randomize the assignment of storage locations so that in all probability no individual volume is ever returned to the same storage location from where the dataset was taken. In addition, the computing device may, before saving, reassign a dataset a new filename derived by randomly generating alphanumeric strings that are lengthy and unique to each of the 8 volumes every time a dataset is saved, further obfuscating the ability of an adversary to locate the "m" volumes needed to even have the possibility of reassembling a dataset. Also, one or more computing devices may be programmed to relocate and/or rename the 8 volumes along with all of the other volumes, in a globally dispersed storage network of volumes, at intervals which may be randomly or deterministically determined. Thus, the disclosed techniques may increase data security by continually performing a global shell game with respect to the placement of data over time in an ever changing number of storage devices.

For example, computing device 130 may disperse the 8 "t" volumes such that none of the 8 volumes ever resides on computing device 130. Furthermore, even after the 8 volumes are stored on 8 out of the 1000 computing devices, the computing devices may be configured to relocate the 8 volumes amongst other of the 1000 computing devices that were previously not storing any of the 8 volumes. The intervals at which this relocation may occur may be determined pseudo randomly by generating a random number and associating the time interval with the alphanumeric sequence of the random number. Alternatively, the intervals for this relocation may be determined according to characteristics pertaining to the data underlying the t volumes. For example, if metadata accompanying the underlying data reveals that the underlying data is extremely confidential, then the interval for this relocation may be set shorter than that of data that is not as confidential. Thus, the confidentiality level of the underlying data may affect the frequency of relocation of the t volumes.

In an alternative embodiment consistent with the present disclosure, the controller in computing device 130 may be configured to select the distributed data storage locations according to a number of factors. These may include, for example, storage space allocation considerations, traffic flow considerations, network congestion considerations, network routing considerations, file characteristics considerations, packet type considerations, communication protocol considerations, or any combination thereof. For example, the controller in computing device 130 may choose not to store data that is processed in accordance with the present disclosure on remote computing device 174. This may be because the controller may determine that remote computing device does not have sufficient storage capacity or that the network path between local computing device 130 and remote computing device 174 is congested. Alternatively, remote computing device 174 may not be able process data packets of the type generated by computing device 130 and, therefore, may be unable to store data processed by the controller on computing device 130. In yet another embodiment, remote computing device 174 may be unable to communicate with computing device 130 because of a communication protocol mismatch. For example, computing device 130 may be configured to transmit data using TCP/IP but remote computing device 174 may be only configured to receive AppleTalk packets. Alternatively, computing device 130 may be configured to communicate via an Ethernet network but remote computing device may be configured for Token Ring only and there may be no protocol conversion device in between. Under such conditions, remote computing device 174 may be unable to store data processed by computing device 130 in accordance with the present disclosure. Therefore, the controller in computing device 130 may choose not to include remote computing device 174 as a recipient of the processed data. Instead, the controller can store the data to volume 176 or such other device as may then be compatible and available.

One of skill in the art will appreciate that computing device 130 may include a component other than a controller that may perform the above-mentioned features. That is, any hardware component, software component, or any combination thereof, that may cause computing device 130 to provide the features discussed herein may be used without departing from the scope of this disclosure.

Furthermore, in an alternative embodiment, computing device 130 may first disassemble the one or more third datasets into multiple data blocks so as to form "t" volumes or "t" data streams and then cryptographically modify the t volumes or t data streams. As discussed above, the encryption may be performed using an encryption module. Furthermore, additional security may be provided by encrypting each volume or data stream with a different key. In yet another embodiment, each volume or data stream may be encrypted using a different algorithm that may be randomly or deterministically selected from a pool of potential encryption algorithms. Deterministic selection may be used as the result of constraints imposed by owners of data whereby the owner may want only a small group of algorithms used, such as AES-256 (the NIST standard for government use) or Serpent or Two Fish. Some other data owners may want to use only proprietary encryption algorithms such as RSA or PSquared, while still others may want to use only Open Source algorithms since they are royalty free. The individually encrypted volumes may then be transmitted over multiple network nodes or stored in multiple local and globally distributed locations.

In an alternative embodiment, the disclosed techniques may further accelerate data transmission rates by employing multiple channels, frequencies, or sub-frequencies for wireless transmissions, and/or via multiple medium voltage powerlines for broadband over powerline transmissions, and/or over multiple network nodes through local network 150 and/or communication network 160 so as to transmit the dispersed data in parallel over multiple conduits, channels, frequencies, or sub-frequencies in a deterministic or nondeterministic manner. As discussed above, local network 150 and communication network 160 may be wired or wireless networks. In an embodiment, where information is transmitted across power line networks, signal stabilizing software/equipment may be used to increase the number of clean frequencies that may be employed. If these networks are wireless networks they may include wireless network nodes such as, for example, wireless access points or wireless routers. Similarly, if these networks are wired networks they may also include wired network nodes such as, for example, a telecom hub that provides for the co-location of internetworking equipment of various Internet Service Providers (ISPs).

In an embodiment, communication network 160 may include a fiber optic network. In this case, the controller in computing device 130 may be configured to disperse the "t" volumes created from the original stream by dispersing the "t" volumes over multiple lambdas in a single strand of fiber, over multiple strands of fiber; or by both methods. Transmitting dispersed data volumes as described above in a fiber optic cable may be done in a deterministic or nondeterministic manner according to disclosed embodiments which may lead to increased aggregate data transmission rates.

In another embodiment, communication network 160 may be a wireless network. This may include, for example, a cellular network, a satellite network, a wireless data network such as a Wi-Fi, WiMax, or microwave network, or any combination thereof. In this case, the controller in computing device 130 may be configured to disperse the "t" volumes created from the original stream across a plurality of frequencies serviceable in at least one radio contained in a wireless or powerline access point, or by means of multiple radios tuned to different channel or frequencies. Transmitting dispersed data volumes as described above through a wireless network may be done in a deterministic or nondeterministic manner according to disclosed embodiments which may lead to increased aggregate data transmission rates. By practicing this technique of the present disclosure, data transmission rates may be increased by transmitting data using parallel transmission techniques instead of the serial transmission techniques employed according to conventional wisdom.

In yet another embodiment consistent with the present disclosure, local network 150 and/or communication network 160 may be electric power lines equipped with Broadband over Powerline ("BPL") equipment. Such a network may also include BPL access points. In this case, the controller in computing device 130 may be configured to disperse the "t" volumes created from the original stream by dispersing the "t" volumes over multiple channels (frequencies) in an individual power line, over one channel in each of multiple power lines, or by both. This may be achieved by multiplexing the signal for a single broadband over powerline cross-conversion card and sending the multiplexed signal or by using a plurality of cross-conversion cards, each of which may transmit unitary or multiplexed signals. Moreover, transmissions from/to multiple cross-conversion cards can contain a single data transmission in a single cross-conversion card or dispersed information may be transmitted by dispersing an admixture of sub-volume-containing packets through the total number of channels and cross conversion-cards then available. Transmitting dispersed data volumes as described above in electric power lines may be done in a deterministic or nondeterministic manner according to disclosed embodiments which may lead to increased aggregate data transmission rates.

In an alternative embodiment, local network 150 and communication network 160 may include a combination of BPL and wireless technologies. By integrating software and/or hardware consistent with the present disclosure into the firmware of BPL cross-conversion equipment or wireless access equipment, data passing through this equipment may become indecipherable to unauthorized use while data transmission rates may be substantially increased. Such networks may further protect users from fraud and identity theft, and in addition connect more efficiently with a cloud computing environment.

Furthermore, wireless access equipment processing data in accordance with the present disclosure may include at least one circuit board comprising at least a chipset. This chipset may be capable of cross-converting data between BPL and wireless modulations by varying one or more properties of the carrier signal with respect to the modulating signal. In addition, the wireless access equipment may also include an operating system software or firmware for cross-conversion of data comprising one or more of the following: a chipset master control software which includes methods for transmitting and receiving digital information; an ("Orthogonal Frequency-Division Multiplexing) ("OFDM") to Ethernet data conversion algorithm; an Ethernet to OFDM data conversion algorithm; a cipher encryption algorithm; a cipher decryption algorithm; a data separating algorithm; a data reassembly algorithm; an encoding or compression algorithm; and decoding or decompression algorithm. The wireless equipment may also include RAM or flash memory; an interface for communicating with wired and wireless networks; and an interface for communicating with a BPL network.

Each BPL device performing data processing in accordance with the present disclosure may provide a variety of features. These functions may include, for example, providing a user with a high resolution, high fidelity audio and/or video presentation system; managing the digital rights of content owners which may include providing security for data encryption/decryption schemes, content usage tracking, various auditing and reporting functions, and the like; tracking a user's movements and responses within his/her operating environment for the purpose of developing, refining and maintaining a psychographic profile of the user; and facilitating the transaction of banking, ecommerce, and other financial activities.

For the most part, BPL devices may not need extra hardware or hardware upgrades if the present system was embedded in software agents that run in server-based data processing systems and user data processing systems. However, if a processor in the BPL chipset cannot handle the additional load resulting from data processing consistent with the present disclosure, it may be advisable to redesign the cross-conversion cards and add additional arithmetic processor circuitry to the ASIC or add a SOC (system-on-a-chip), such as the Intel® EP80579 Integrated Processor. The addition of a SOC may increase device headroom. This may also be needed to provision mobile network objects with enough intelligence to operate efficiently on the system. Moreover, adding an embedded system on a separate card connected to the BPl, buss, or SOC to cross-conversion cards may provide additional headroom for military and other high efficiency applications.

In some embodiments consistent with the present disclosure, BPL and Wireless equipment may be controlled with ASICs such as, for example, OFDM ASICs. In many cases, the existing ASIC may be powerful enough to process data in a manner consistent with the present disclosure. However, in some cases, hardware in BPL and Wireless equipment may require additional resources for the disclosed data processing, such as, for example, flash memory, ASIC enhancements, an additional ASIC, or the addition of more circuits or circuit boards to accommodate the functionality of an embedded system, system on a chip (SOC), or other hardware-dependent or software-dependent functionality.

As discussed above, the aggregate effective data rates through communication network 160 may be increased by transmitting data along multiple parallel transmission routes, irrespective of the medium of transmission by using techniques consistent with the present disclosure. In addition, the present system may also increase data security. Specifically, data that is compressed and rendered indecipherable to unauthorized use according to the disclosed techniques may be separated deterministically or non-deterministically, dispersed, and transmitted across multiple data paths to and from multiple storage devices which can be locally present or geographically distributed. This may have the effect of further increasing data security since no complete dataset or forensically discernible data would ever be sent across a single network path or stored on a single storage device. In most cases, this may be naturally achieved as a result of datasets being dispersed according to the practice of the present disclosure, being disassembled, and separated into multiple volumes which are sent to a plurality of geographically distributed storage locations. The diversity of geographically separated storage locations may assure the likelihood that most volumes will be transmitted over different network nodes; especially over a global WAN that is populated by a large number of potential storage locations. These locations may include, for example, banking institutions, post offices, government installations, military bases and operations, hospitals, clinic and medical centers. Practicing the shell game may make data nearly as secure when stored in, for example, a New York City street corner news booth as it is in a high security datacenter.

In an alternative embodiment, techniques consistent with the present disclosure may be used in a cloud computing environment. Cloud computing is a style of computing in which dynamically scalable and often virtualized resources are provided as a service over the Internet. Users need not have knowledge of, expertise in, or control over the technology infrastructure of the "cloud" that supports them. The concept incorporates infrastructure as a service (IaaS), platform as a service (PaaS), and software as a service (SaaS), as well as other recent (ca. 2007-2010) technology trends that have the common theme of reliance on the Internet for satisfying the computing needs of the users. Cloud computing services may provide business applications online that are accessed from a web browser, while software and data are stored on cloud servers. In an embodiment consistent with the present disclosure, the term cloud may be used as a metaphor for the Internet, based on how the Internet is depicted in computer network diagrams, and is an abstraction for the complex infrastructure it conceals.

Typically, users of a cloud computing system may be globally distributed and do not use conventional workstations and laptops because most of the data processing functions that the users need are provided by systems in the cloud. To this end, a remote user's data processing system can be any device that links to the cloud computing system in such a manner as to facilitate data processing functions between the remote user's data processing system and the cloud system's data processing system. By practicing techniques consistent with the present disclosure, the rate of transmission of data between users and the cloud can be increased. This is at least because of the ability to transmit data in a compressed state and also disperse the data over multiple physical media and/or multiple frequencies as discussed above. In addition, the encryption and information dispersion techniques consistent with the present disclosure may ensure that information stored on a user's data processing system and the cloud data processing system is at all times held in a state that is indecipherable to unauthorized use.

In an example embodiment, the cloud computing network which facilitates reliable cloud computing services may be populated by a plurality of "cloud computing service zones." Cloud computing service zones may collectively provide a virtual computing environment including a ubiquitous dispersion of wired and wireless network information which is redundantly allocated within the cloud computing service zones. To increase security, no single cloud computing service zone may contain a complete dataset of any information file. Instead, the data that comprises a dataset would be dispersed in a deterministic or nondeterministic manner over the plurality of cloud computing service zones in a manner consistent with the present disclosure.

Figure 2:
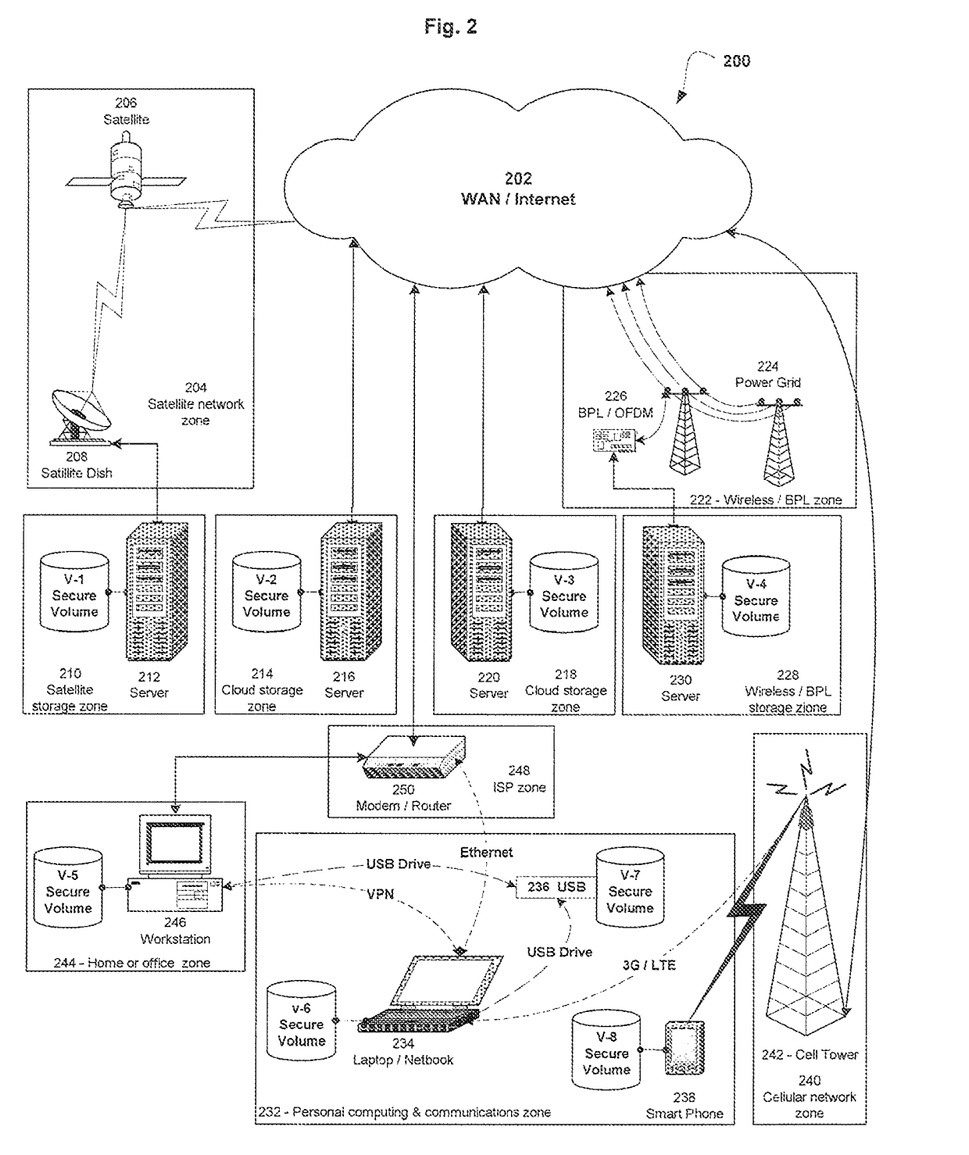
FIG. 2 is a schematic representation of cloud computing system 200 for securely transmitting and storing information according a disclosed embodiment.

FIG. 2 provides a schematic representation of a cloud computing system 200 for securely transmitting and storing information according a disclosed embodiment. System 200 includes a WAN/Internet 202, a satellite network zone 204, a satellite 206, a satellite dish 208, a satellite storage zone 210, a server 212, a first storage zone 214, server 216, a second storage zone 218, server 220, a wireless/BPL network zone 222, server 230, wireless/BPL zone 222, a power grid 224, a BPL/OFDM access point 226, a wireless/BPL storage zone 228, server 230, a personal computing and communications zone 232, a laptop/netbook 234, a USB drive 236, a smart phone 238, a cellular network zone 240, a cell tower 242, a home or office zone 244, a workstation 246, an ISP zone 248, and modem/router 250.

In an embodiment, system 200 may be divided into several cloud computing service zones that directly or indirectly connect with WAN/Internet 202. These cloud computing service zones are used for communication and/or data storage purposes. For example, satellite network zone 204 may connect satellite storage zone 210 to WAN/Internet 202. To this end, satellite network zone 204 may include a satellite 206 and a satellite dish 208. Satellite dish 208 may transmit and receive data to/from server 212 located in satellite storage zone 210. In addition, satellite 206 may bi-directionally transfer this satellite storage zone data to/from WAN/Internet 202. Server 212 may include software or hardware or any combination thereof capable of practicing the data compression, encryption, and dispersion techniques consistent with the present disclosure. In particular, server 212 may include a secure storage volume V-1 capable of storing data processed according to techniques consistent with the present disclosure.

System 200 may also include a first storage zone 214. First storage zone 214 may connect to WAN/Internet 202 via a physical medium such as, for example, one or more fiber optic cables. First storage zone 214 may also include server 216 which may be similar to server 212 in that it may capable of practicing the data compressing, encryption, and dispersion techniques consistent with the present disclosure. In particular, server 216 may include a secure storage volume V-2 capable of storing data processed according to techniques consistent with the present disclosure. System 200 may similarly include second storage zone 220 which includes a server 218. Server 218 may include secure storage volume V-3 which is similar to storage volumes V-1 and V-2.

System 200 also includes a Wireless/BPL zone 222 which bi-directionally transfers data to WAN/Internet 202 via one or more power grids 224. To this end, each power grid 224 may include one or more BPL/OFDM access points 226. The specifics of these access points have been discussed above and, therefore, will not be repeated for purposed of brevity. Wireless/BPL storage zone 228 may connect to Wireless/ BPL zone 222 via cables such as, for example, fiber optic cables that may further connect to a hybrid multi-technology network comprised of, for example, fiber, broadband over powerline, wireless, and coaxial technologies. Wireless/BPL storage zone 228 may include server 230 which, similar to servers 212, 216, and 220, may include secure storage volume V-4.

One of skill in the art will appreciate that while system 200 depicts a single server in each storage zone, the disclosure is not limited thereto. Rather, each storage zone 210, 214, 218, and 228 may include multiple servers or other storage devices that may store and process data using techniques consistent with the present disclosure without departing from its scope. Moreover, each service zone depicted symbolizes a plurality of such service zones each of which may perform that or a similar function. Furthermore, while the present disclosure does not discuss in detail how each service zone may connect to WAN/Internet 202, one skilled in the art will appreciate that the present disclosure contemplates the use of any technique known for such connections. For example, satellite 206 may be a geostationary satellite or a low earth orbiting satellite or any other type of satellite capable of providing bidirectional communication between WAN/Internet 202 and satellite storage zone 210. Furthermore, satellite 206 may use communication technologies such as, for example, Time Division Multiple Access (TDMA), or Single Channel Per Carrier (SCPC) or other such technologies for providing bidirectional communication between WAN/Internet 202 and satellite storage zone 210. Similarly, Wireless/BPL zone 222 may include devices such as BPL access points that provide the technology for transmitting data over electric power lines. In addition, or alternatively, Wireless/BPL zone 222 may use wireless adapters using frequency modulation techniques such as, for example, OFDM for wireless communications between Wireless/BPL storage zone 228 and Wireless/BPL zone 222.

System 200 may include additional cloud computing service zones. These may include a personal computing and communications zone 232, a cellular network zone 240, a home or office zone 244, or an ISP zone 248 or any combination thereof. In an embodiment, personal computing and communication zone 232 may include a PC, laptop, PDA, or other computing device or any combination thereof. For example, as shown in FIG. 2, personal computing and communication zone 232 includes Laptop/Netbook 234. Laptop/ Netbook 234 may include a secure storage volume V-6. The characteristics of secure storage volume V-6 may be similar to those of secure storage volumes V-1 through V-4 in that it is capable of storing data processed according to techniques consistent with the present disclosure. Furthermore, personal computing and communications zone 232 may also include a USB drive 236 that is insertable into laptop/netbook 236. USB drive 236 may include yet another secure storage volume V-7 similar to other storage volumes in system 200. Additionally, smart phone 238 may also be part of personal computing and communications zone 232. Smart phone 238 may include yet another storage volume V-8 similar to other storage volumes in system 200. Smart phone 238 may connect via a cellular network such as a 3G, Long Term Evolution ("LTE"), or any other such network to cell tower 242 in cellular network zone 240. Cell tower 242 may interface with WAN/Internet 202 to provide bidirectional communication between WAN/Internet 202 and smart phone 238.

One of skill in the art will appreciate that while FIG. 2 depicts one laptop/netbook 234, and one smart phone 238, other kinds of personal computing devices and smart devices and any number of such devices, each including secure storage volumes, may be used without departing from the scope of this disclosure.

In an embodiment, personal computing and communications zone 232 may also connect to a home or office zone 244. The connection between personal computing and communications zone 232 and home or office zone 244 may be via any communication network such as, for example, a Virtual Private Network ("VPN") as depicted in FIG. 2. Furthermore, home or office zone 244 may include one or more workstations 246. Workstation 246 may include storage secure volume V-5 which may be similar to other secure storage volumes in system 200.

Personal computing and communications zone 232 and Home or office zone 244 may connect to ISP zone 248. The connection between these zones and ISP zone 248 may be wired or wireless via networking equipment such as, for example, modem/router 250, or other such equipment. ISP zone 248 may provide bidirectional communication between WAN/Internet 202, personal computing and communications zone 232 and Home or office zone 244.

One of skill in the art will appreciate that the description of cloud computing system 200 is for example purposes only and that many variations of cloud computing system 200 fall within the scope of this disclosure. For example, alternative embodiments could include additional or fewer cloud computing service zones and/or different types of cloud computing service zones. Furthermore, each cloud computing service zone could have multiple secure storage volumes and each device in a cloud computing service zone may have multiple secure storage volumes.

A user of system 200 may use software, hardware, or any combination thereof embodying the information compression, encryption, dispersal, transmission, and storage techniques discussed above to ensure that information stored on the user's data processing system and the cloud data processing system is at all times maintained in a state that is indecipherable to unauthorized use and that no single device in a cloud computing service zone may contain a complete dataset of any information file. For example, a user may create or modify a data file on laptop/netbook 234. In addition, the user may have access to all the other cloud computing service zones depicted in FIG. 2. By using techniques consistent with the present disclosure as described, for example, with respect to FIG. 1, software, hardware, or any combination thereof on laptop/netbook 234 may compress and encrypt the data file. In addition, if system 200 is configured to disperse the data file according to techniques consistent with the present disclosure into 8 volumes (t=8) such that 2 out of the 8 volumes (m=8) contain a complete data set, then the user may backup this data file by dispersing it into 8 separate volumes spread across secure storage volumes V-1 through V-8 in system 200 as depicted in FIG. 2. If techniques are practiced according to those consistent with the present disclosure, periodic backups as practiced by conventional wisdom may no longer be necessary because information is stored in 8 local and remote locations as soon as each file is saved, making backups only desirable for creating archival snapshots to preserve a historical record of the evolution of data over time. Thus, portions of the data file may be stored in laptop/netbook 234, smart phone 238, usb 236, workstation 244, and servers 212, 216, 218, and 228 such that no device contains a complete copy of the data file. One of skill in the art will appreciate that for system 200 to work in the manner described, all the devices in system 200 would include software, hardware, or any combination thereof that would allow for the processing and storage of data using techniques described in the present disclosure.

When the user decides to retrieve his data file, he can do so by restoring the data file from any 2 of the 8 volumes. Thus, any 6 of the 8 volumes could be destroyed without affecting the integrity of the user's data file.

In an alternative embodiment, the retrieval of volumes may be prioritized so that a computing device attempts to first retrieve volumes which are locally stored before it accesses volumes which are remotely stored. This technique which is consistent with the present disclosure may conserve bandwidth and accelerate the retrieval process. Likewise, the transmission of volumes may be prioritized so that the controller attempts to first transmit volumes to local storage devices before transmitting volumes to remote storage locations. This technique which is consistent with the present disclosure may provide greater assurance that "m" data will survive the storage process, because local devices have a higher probability of receiving the data intact and more rapidly than remote locations.

In yet another embodiment, "m" volumes may need to be saved to preserve data integrity. In such a case, the computing device may attempt to use the m volumes to generate the desired number t volumes subsequent to the save process or at a future time. This feature may be used in mobile ad hoc radio because it is assumed that multiple receiving units may be offline or out of range when the save cycle is initiated.

System 200 may make it possible for all of a user's computing and communications devices to share a single library of data that is compressed, enciphered, and randomly or pseudo randomly separated into primary data units, like bits, nibbles, bytes, and/or blocks, and dispersed into eight secure storage volumes of variable size that are linked with the cloud. As discussed above, the values of "t" and "m" are selectable by a user of system 200 and are not limited to those used in the disclosure above.

System 200 may allow a user to maintain his computing and communications environment irrespective of his actual location. This location-agnostic feature of the present system is possible because techniques described by the present disclosure are transmission medium and transmission protocol agnostic. Thus, a user could be at any location on air, land, or sea, and could be mobile or stationary but yet always have access to data backed up on cloud computing system 200 as long as he can connect to such a system.

Cloud computing system 200, in accordance with the present disclosure discussed above, includes several features. Data may be enciphered using any one, or a combination, of encryption algorithms such as, for example, PSquared, AES-256, 3DES, or Two Fish. Furthermore, because data may be stored and transferred in a compressed state, data transfers to and from the cloud are typically accelerated. Furthermore, because compressed, enciphered, datasets may be separated into primary data elements, like bits, nibbles, bytes, and/or blocks, which are subsequently dispersed as partial datasets to multiple local and global locations in a deterministic or non-deterministic manner, no complete dataset ever exists in a single volume, or in a single storage location, or if desired never travels over a single network node or route. In addition, volume names and filenames may be created and recreated as random alphanumeric strings each time data is saved so no one can discern what sort of data a file contains from the file or volume name.

The transmission techniques used in the above-disclosed system may also make it difficult to determine which data storage location is holding which portion of a dataset. Specifically, files and volumes may be deterministically or non-deterministically dispersed over new and different network routes to new and different storage locations each time a dataset is saved or transmitted, thereby creating a global "shell game" where no one, including the owner of the data, knows which storage location is holding which volume or which partial dataset.

Similar to the features discussed with respect to FIG. 1, a system in accordance with the present disclosure may interrogate a secure storage volume to determine the amount of storage space available and deterministically or non-deterministically generate a partial dataset to store on the interrogated volume.

In an alternative cloud computing embodiment, a bit stream may first be disassembled into multiple data streams or volumes and then each data stream or volume may be encrypted separately. Furthermore, additional security may be provided by encryption each volume or data stream with a different key. In yet another embodiment, each volume or data stream may be encrypted using a different algorithm that may be deterministically or non-deterministically be selected from a pool of potential encryption algorithms.

In yet another embodiment, the systems 100 and 200 discussed above may practice extreme bandwidth conservation ("XBC."). Many systems such as, for example, cloud computing systems use applications such as, for example, word processing programs, spreadsheet programs, graphic image processing programs, and the like to create and manipulate users' data, or in wireless and BPS access points for transmitting and receiving information such as autoconfiguration data. These operations may require substantial transfers of data between users and cloud computing resources. An additional embodiment contemplated by the present disclosure is a system that may reduce the need to transmit data that is commonly used by such applications.

The basic architecture of this embodiment may be the same as system 100 in FIG. 1. Therefore, a detailed discussion of each component will not be repeated for purposed of brevity. Rather, only those aspects relevant to an alternative embodiment will be discussed below.

Computing devices, 130 and 174 may be configured in software, hardware, or a combination of both to perform techniques consistent with the present disclosure. At a high level, computing device 130 and point computing device 174 may store data in the form of one or more arrays, called an XBC array. In order to transfer information stored in an XBC array, computing device 130 may form a pointer pointing to data in the one or more data array, wherein the pointer references data in the corresponding data array. The pointer may be a two dimensional pointer. In addition, after an initial transmission, rather than transmitting the data stored in an XBC array, computing device 130 may transfer only the pointer for any data item of the one or more data arrays to computing device 174 across local network 150 and communication network 160. Upon receipt of a pointer, remote computing device 174 may reference the data stored in a local XBC array. Thus, the present system reduces the actual amount of data passed between computing devices 130 and 174.

In an embodiment, computing devices 130 and 174 may include a controller (not shown) configurable to perform the above-mentioned features. These may include, for example, at least a portion of a control processing unit configured to execute software instructions that may perform these features, at least a portion of one or more memory units that store these software instructions, and any other components necessary to perform the above-mentioned features.

Specifically, a controller in computing device 130 may be configured to create a fixed or variable length XBC array and populate the array with data. This data may be user data, meta data or any other kind of data that needs to be stored on computing device 130. The XBC array data may include, for example, a string of fixed length, an integer, a real number, an internal pointer, an external pointer to another XBC array, an external pointer to a software program or utility, a code block or element of a code block, an executable instruction or an element of an executable instruction, or one or more parameters and/or arguments to initialize a code block or executable instruction, or any combination thereof. Alternatively, if a XBC array already exists it may be populated with only such data that is missing or needs modifying. In an embodiment, a XBC array is stored in at least one memory component of computing device 130 and at least one or more component of computing device 174. For example, if computing device 130 is an OFDM device, the array can be preloaded to reside in memory. Alternatively, the XBC array can be preloaded to reside in volatile or nonvolatile memory. In yet another alternative embodiment, if the XBC array is not preloaded, it would be created and populated with information during an initialization process.

For example, in an embodiment, the XBC control array(s) can be pre-packaged within the device firmware and thereafter remain unchanged until the device receives an update. Alternately, the control array may not be prepackaged. Rather, it may only have a memory allocation in the device. A device attempting to transmit pointers may first test to see if the array is present and, if it is, determine if it is the current version. If the array is present and up-to-date, the device may send the package of one or more pointers. However, if the array is not present and up-to-date, the device may first send the array and then follow up with a package of one or more pointers.

The controller in computing device 130 may be further configured to form a pointer for any data item in one or more XBC arrays. Thus, each two dimensional pointer may reference data in a corresponding XBC array. In an embodiment, the controller in computing device 130 may create such a pointer by separating a byte into 2 nibbles to create a xy pointer to a XBC array.

The controller in computing device 130 may be further configured to then pass the pointer across local network 150 and communication network 160 to remote computing device 174 instead of transferring the actual data stored in their corresponding XBC arrays. Upon receipt of the pointer, remote computing device 174 may use the received pointer to reference the corresponding data from the XBC arrays stored in computing device 174. Use of such a technique may conserve bandwidth on networks because the pointers transferred across a network may use a fraction of the bandwidth that would have been used if the data that the pointers referenced had been transferred.

One of skill in the art will appreciate that computing device 130 may include a component other than a controller that may perform the above-mentioned features. That is, any hardware component, software component, or any combination thereof, that may cause computing device 130 to provide the features discussed herein may be used without departing from the scope of this disclosure.

One of skill in the art will appreciate that computing devices 130 and 174 from FIG. 1 were used for example purposes only. That is, the above disclosed bandwidth conservation techniques can be used to transfer data between any two devices configured with the appropriate software, hardware, or a combination thereof, to perform techniques consistent with the present disclosure. Furthermore, while an embodiment for bandwidth conservation was discussed with respect to system 100, one of skill in the art will appreciate that the above-discussed techniques may be used in a cloud computing system such as system 200 described with respect to FIG. 2, without departing from the scope of this disclosure. Additionally, the bandwidth conservation techniques described above may be used by themselves or in conjunction with the data parsing, compression, encryption, disassembly, and dispersion techniques consistent with the present disclosure.

Techniques consistent with the present disclosure may help increase the throughput rate of WiMax networks. For example, in an embodiment, the compression feature disclosed above may increase the throughput of WiMax devices from about 10 Mbps at about 10 kilometers to about 20 Mbps to about 40 Mbps at about 10 kilometers depending upon the type of data being transferred and other factors like sun spot, atmospheric considerations like humidity and lightning, among others. This may increase the use of wireless access points consistent with the present disclosure as backhaul devices in hybrid BPL and wireless networks, thereby reducing reliance on fiber optic cable for backhaul operations.

Furthermore, separating and dispersing data streams using techniques consistent with the present disclosure and transmitting the separated data over multiple channels, frequencies, or sub-frequencies may further increase the effective bandwidths of wireless devices practicing this system by about 2 to as many as about 18 times or more above the standard data transmission rate of these wireless devices.

The present system may also be used in Unicast Multimedia Presentation Services. Generally, unicast presentation services may be preferred over multicast presentation services. Some of the perceived limitations of multicast presentation services are that multicast presentation services do not allow for any direct interaction between a host broadcast service and its users and that multicast services cannot provided a true video-on-demand service. Unicast presentation services overcome these limitations but are bandwidth intensive. Practice of the present system may enhance the effectiveness of Unicast Multimedia Presentation Services. For example, when streaming video files and other rich content multimedia files are compressed, rendered indecipherable to unauthorized use, and geographically dispersed into a multitude of storage locations in accordance with the present disclosure, several limitations pertaining to delivering content-on-demand, video-on-demand, TV-on-demand, and other such rich multimedia content services to globally distributed communities of subscribers may be remedied. For example, the bandwidth limitations faced by existing unicast presentation services may be overcome by using the compression and information dispersal techniques consistent with the present disclosure.

The present system may also be used to satisfy the needs of content providers. Some of the concerns voiced by content providers such as, for example, Miramax, Paramount, and Sony Films, are: a) content management rights security and b) the need to maintain content quality standards that are suitable to the content provider. Practicing the present system may meet or even exceed the quality and security concerns of content providers by modifying conventional digital multimedia files like MPEG-2, MPEG-4 or such other video codecs in such a manner that the digital multimedia files are indecipherable to eavesdropping and theft. In addition, practicing the present system may serve the needs of network providers by compressing video streams to a compactness that is not achieved through other means. Additionally, bandwidth conservation methods of the present disclosure may reduce the amount of network control information needed to support unicast streaming services.

The present system may also enhance services delivered by satellite. Specifically, practicing the present system may secure satellite systems by compressing, enciphering, and separating data so as to accelerate bidirectional transmissions of satellites. Furthermore, the present system may also further enhance security by dispersing separated data subsets over multiple frequencies. In addition, by practicing the bandwidth conservation techniques consistent with the present disclosure, the transmission of all control instructions for a satellite system may be further accelerated and secured by constructing the control instructions from abstracted data primitives preloaded in the satellite's XBC array set. This may make harmful hacking of the satellite system very difficult because the abstracted data primitives may be changed at random intervals. Enhanced security may be achieved by periodically at random intervals, or at intervals which are deterministically established, replace the XBC information arrays with new versions, whereby the data referenced in the array elements are modified or repositioned within the array and the pointers referencing this data are updated to reflect these changes, further obfuscating access to information.

Figure 3:
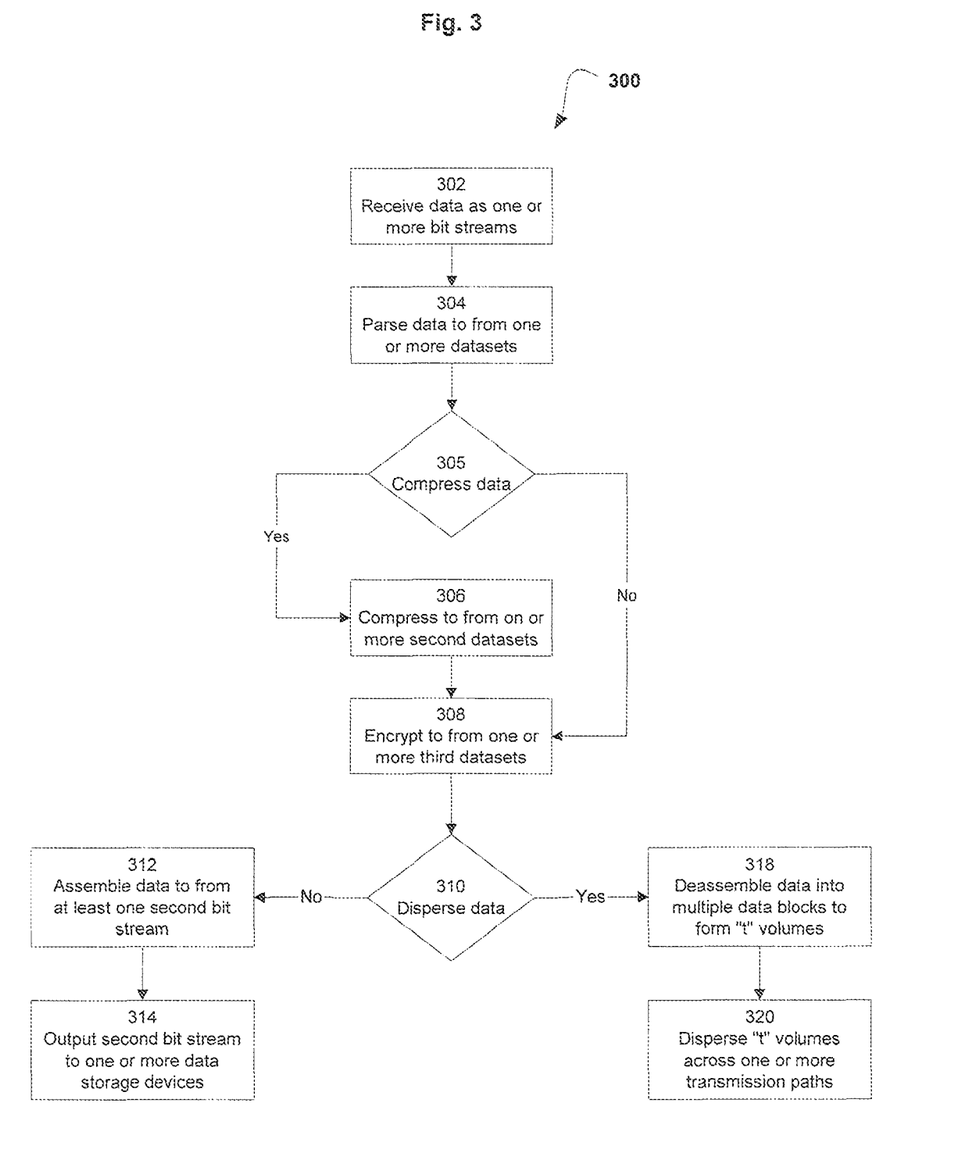
FIG. 3 is a flow chart representation of a method 300 for securely transmitting and storing digital information according to a disclosed embodiment.

FIG. 3 provides a flow chart representation of a method 300 for securely transmitting and storing digital information according to an embodiment consistent with the present disclosure. In an embodiment, the disclosed method may be an algorithm coded into computer software executable on one or more computing devices.

At step 302, a computing device such as, for example, computing device 130 in FIG. 1 or device 234 in FIG. 2, receives data in the form of one or more bit streams from an input device such as, for example, input device 110 or local network 150 in FIG. 1 or from any device or network in FIG. 2. At step 304, a parsing module such as the one described above with respect to FIG. 1, within the computing device parses the one or more bit streams to form one or more first datasets. At step 305 a computing device, such as the one described above with respect to FIG. 1, makes a decision as to whether the one or more first datasets needs to be compressed. If the data in the one or more first datasets is deemed by the computing device to be resistant to compression, this step is skipped and program execution advances to step 306. Otherwise program execution advances to step 308 where one or more of a plurality of compression algorithms are applied to the dataset. At step 306, a compressing module such as the one described above with respect to FIG. 1, in the computing device compresses the one or more first datasets to form one or more second datasets. At step 308, an encryption module such as the one described above with respect to FIG. 1, within the computing device cryptographically modifies the one or more second datasets to form one or more third datasets. At step 310, a decision is made within the computing device as to whether the data in the one or more third datasets needs to be dispersed. If the data does not need to be dispersed, then at step 312 an assembly module in the computing device assembles the one or more third datasets to form at least one second bit stream. At step 314, the at least one second bit stream is output to one or more data storage devices. These may include, for example, local data computing devices 140, 142, 144, and 146 and/or remote computing devices 172, 174, 176, and 178 in FIG. 1. In an alternative embodiment, the data storage devices may include any of the devices depicted in FIG. 2 such as, for example, servers 212, 216, 220, and 230.

On the other hand, if at step 310, a decision is made by computing device 130 to disperse the data in the one or more third datasets, then at step 318, a dispersal module such as the one described above with respect to FIG. 1, in the computing device disassembles the one or more third datasets into multiple data blocks to form "t" volumes as part of at least one second bit stream such that "m" number of volumes contain a complete data set, wherein m<t. At step 320, the dispersal module in the computing device disperses the t volumes across one or more transmission paths and stores the t volumes across a plurality of distributed storage locations, such that no complete dataset is stored at a single storage location. These storage devices may be any combination of local data computing devices 140, 142, 144, and 146 and remote computing devices 172, 174, 176, and 178 in FIG. 1. In an alternative embodiment, the data storage devices may include any of the devices depicted in FIG. 2 such as, for example, servers 212, 216, 220, and 230, including but not limited to office and home office storage devices 234, 236, and 246. In addition, a personal smart phone may be used as a storage device that communicates with any or all of local data computing devices 140, 142, 144, and 146 and remote computing devices 172, 174, 176, and 178 in FIG. 1, by means of cell tower 242 in FIG. 2.

Figure 4:
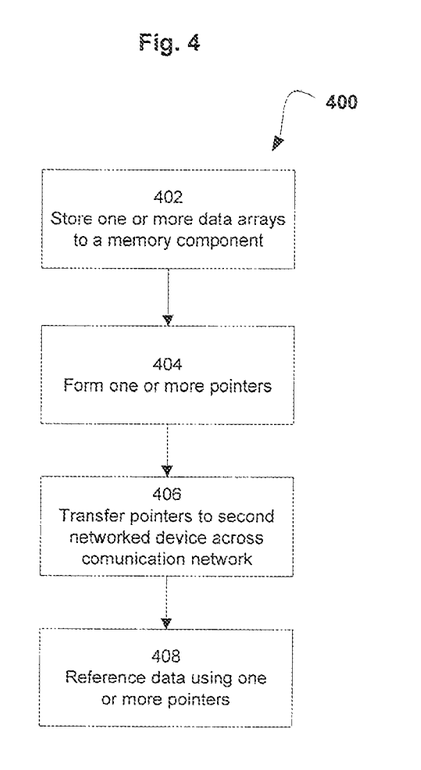
FIG. 4 is a flow chart representation of a method 400 for conserving bandwidth during the transmission of data between a plurality of networked devices according to a disclosed embodiment.

FIG. 4 provides a flow chart representation of a method 400 for conserving bandwidth during the transmission of data between a plurality of networked devices according to an embodiment consistent with the present disclosure. In an embodiment, the disclosed method may be an algorithm coded into computer software executable on one or more computing devices. At step 402 a first networked device such as, for example, computing device 130 in FIG. 1 (or device 234 in FIG. 2) which is connected with a communication network such as communication network 160 in FIG. 1 (or WAN/Internet 202 in FIG. 2), may store one or more data arrays in at least one memory component. Similarly, a second networked device such as, for example, remote data computing device 174 in FIG. 2 (or server 230 in FIG. 2) may store one or more data arrays in at least one memory component. At step 404, the first networked device may form a pointer for each data item in the one or more data arrays, wherein each pointer references data in the corresponding data array. At step 406, the first networked device may transfer the pointers for each of the one or more data arrays to the second networked device across the communication network. At step 408, the second networked device 174 may reference data stored in the one or more data arrays via the transferred corresponding pointers. In an embodiment, the pointers may be two dimensional.

One of skill in the art will appreciate that in addition to systems and methods for rendering information that is highly compressed and indecipherable to unauthorized use, and the like, as described above, such systems and methods also include features to reverse the process and restore any and all data that was so altered or modified back to its original features.

One of skill in the art will appreciate that no process of the present disclosure is truly random. Thus, while the pseudorandom or non-determinist processes so employed may use seemingly arbitrary decisions and criteria to select the methods by which data is modified, in all cases the processes so employed to modify data are stepwise procedures that act to modify data for a specific purpose. Each process so employed for parsing, compressing, encrypting, and dispersing is non-random (deterministic). Therefore, by precisely reversing the sequence of processes, the data may be restored to its original form in a stepwise reverse fashion. Even if information is dispersed by disassembling the information, generating a random number sequence, and associating the dataset with the random number sequence, returning data to its original state is a matter of using the same random number sequence, but running the processes in the opposite direction to reassemble the information. All such processes are lossless. Because all techniques employed by the present disclosure which do the work of modifying data are non-random, all such techniques are reversible.

While various embodiments of the present disclosure have been described above, it should be understood that they have been presented by way of example only, and not limitation. It will be understood by those skilled in the art that various changes in form and details may be made therein without departing from the spirit and scope of the disclosure. Thus, the breadth and scope of the disclosure should not be limited by any of the above-described exemplary embodiments.

We claim:

1. A system for securely storing and transmitting digital information including:
    a computing device connected to at least one of a network device or a storage device or both; and
    a communication network connected to the at least one of a network device or the at least one of a storage device, or both;
    wherein the computing device is configured to:
        parse at least a portion of one or more bit streams to form a plurality of first datasets;
        disperse the plurality of first datasets into multiple data blocks to form t volumes as part of a plurality second bit streams such that in number of volumes contain a complete data set, wherein m<t; and
    output the t volumes either across a plurality of transmission paths or to a plurality of distributed storage locations, such that no complete dataset is stored at a single storage location or travels over a single transmission path.

2. The system of claim 1, wherein the computing device is configured to disperse the t volumes to at least one of a wired network, a wireless network, a wired network node, or a wireless network node, or any combination thereof.

3. The system of claim 2, wherein a transmission over one or more wired or wireless nodes occurs over at least one of a plurality of fiber optic strands, a plurality of lambdas within at least one fiber optic strand, a plurality of frequencies in at least one wireless access point, a plurality of electric power lines equipped with BPL (Broadband over powerline) transmission equipment, a plurality of frequencies in one or more BPL access points, or any combination thereof.

4. The system of claim 1, wherein the formation of the plurality of second bit streams and the plurality of first datasets includes modifying original information in the one or more first bit streams and the plurality of first datasets such that the modified information includes characteristics different than those of the original information such that the integrity of the original information remains uncompromised.

5. The system of claim 1, wherein the computing device is configured to disperse the t volumes in a pseudorandom manner.

6. The system of claim 1, wherein the plurality of distributed storage locations includes a plurality of local storage locations, a plurality of remote storage locations, or any combination thereof.

7. The system of claim 1, wherein the computing device is further configured to select the plurality of distributed data storage locations in a random or pseudorandom manner.

8. The system of claim 1, wherein the computing device is further configured to select the distributed data storage locations according to at least one of storage space allocation considerations, traffic flow considerations, network congestion considerations, network routing considerations, file characteristics considerations, packet type considerations, communication protocol considerations, network management considerations, or any combination thereof.

9. The system of claim 1, wherein information transmitted and/or stored includes multimedia information.

10. The system of claim 1, wherein information transmitted and/or stored includes either:
    (a) instructional programs and materials, distance learning study courses, and educational curricula;
    (b) medical records and archives, prescriptions and prescription records, research data, and/or diagnostic images and information;
    (c) data for financial transaction processing activities, financial transaction processing records, financial accounts, and financial archives;
    (d) data for bidirectional audio and/or visual communications between globally distributed users and devices; or
    (e) data for bidirectional communications, control, and monitoring of remote devices and software; or any combination of (a), (b), (c), (d), or (e).

11. The system of claim 1, wherein the computing device is configured to cryptographically modify the volumes after the formation of the t volumes.

12. The system of claim 1, wherein the computing device is configured to randomize an assignment of storage locations for the t volumes such that no individual volume of the t volumes is stored at a storage location from where it originates.

13. The system of claim 1, wherein the computing device is configured to relocate the t volumes amongst a plurality of storage locations at randomly or deterministically determined intervals.

14. The system of claim 1, wherein the computing device is further configured to compress and/or cryptographically modify the plurality of first data sets before dispersing the plurality of first data sets.

15. The system of claim 14, wherein the computing device is further configured to:
    overwrite one or more memory locations holding the at least a portion of one or more first bit streams with a random or non-random data pattern after the parsing;
    overwrite one or more memory locations holding the plurality of first datasets with a random or non-random data pattern after the compressing and/or
    cryptographic modifying.

16. The system of claim 14, wherein the computing device is configured to compress the plurality of first data sets using a LZ177, PAQ8PX, and/or LZMA(1) algorithm.

17. The system of claim 1, wherein the computing device is further configured to assign each of the plurality of first datasets a filename derived by randomly generating alphanumeric strings.

18. The system of claim 1, wherein the computing device is further configured to cryptographically modify each of the t volumes separately.

19. The system of claim 18, wherein the computing device is further configured to assign a different key to each of the cryptographically modified t volumes.

20. The system of claim 18, wherein the computing device is configured to cryptographically modify each of the t volumes separately using at least two different encryption algorithms so that at least two of the t volumes are cryptographically modified using different encryption algorithms.

21. The system of claim 1, wherein at least two of the first datasets are dispersed in different volumes.

22. The system of claim 1 wherein the computing device prioritizes the transmission of the volumes by first transmitting to local storage devices before transmitting the volumes to remote storage locations.

23. The system of claim 1 wherein the computing device prioritizes the retrieval of the volumes by first retrieving the volumes that are locally stored before retrieving volumes that are remotely stored.

24. The system of claim 1 wherein the computing device prioritizes the transmission of the volumes by first transmitting to storage devices to which transit times are shorter before transmitting the volumes to storage locations to which transit times are longer.

25. The system of claim 1 wherein the computing device prioritizes the retrieval of the volumes by first retrieving the volumes that are retrieved more quickly before retrieving volumes that are retrieved less quickly.

26. The system of claim 1 wherein the plurality of first datasets are not uniform in size.

27. The system of claim 1 wherein the volumes are not uniform in size.

28. A method for securely storing and transmitting digital information including:
    receiving, from an input device, at least a portion of one or more first bit streams;
    parsing, with a parsing module of a computing device, the at least a portion of the one or more bit streams to form a plurality of first datasets;
    dispersing, using a dispersal module, the plurality of first datasets into multiple data blocks to form "t" volumes as part of a plurality of second bit streams such that "m" number of volumes contain a complete data set, wherein m<t; and
    outputting, using the dispersal module, the t volumes either across a plurality of transmission paths or to a plurality of distributed storage locations, such that no complete dataset is stored at a single storage location or travels over a single transmission path.

29. The method of claim 28, further including dispersing the t volumes to at least one of a wired network, a wireless network, a wired network node, or a wireless network node, or any combination thereof.

30. The method of claim 28, wherein the forming the plurality of second bit streams and the plurality of first datasets includes modifying original information in the plurality of first bit streams and the plurality of first datasets such that the modified information includes characteristics different than those of the original information such that an integrity of the original information remains uncompromised.

31. The method of claim 28, wherein the dispersing of the t volumes occurs in a pseudorandom manner.

32. The method of claim 28, wherein the plurality of distributed storage locations includes a plurality of local storage locations, a plurality of remote storage locations, or any combination thereof.

33. The method of claim 28, further including selecting, using a selection module, the distributed data storage locations according to at least one of storage space allocation considerations, traffic flow considerations, network congestion considerations, network routing considerations, file characteristics considerations, packet type considerations, communication protocol considerations, network management considerations, or any combination thereof.

34. The method of claim 28, further comprising:
    compressing, with a compressing module of the computing device, the plurality of first datasets before dispersing the plurality of first data sets; and/or cryptographically modifying, with an encryption module of the computing device, the plurality of first datasets before dispersing the plurality of first data sets.

35. The method of claim 34 whereby the compressing, cryptographically modifying, outputting, and dispersing routines are accomplished by a single routine or module.

36. The method of claim 34 further including:
overwriting one or more memory locations holding the at least a portion of one or more first bit streams with a random or non-random data pattern, after the parsing;
overwriting one or more memory locations holding the plurality of first datasets with a random or on-random data pattern after the compressing and/or the cryptographic modifying.

37. The method of claim 34, wherein the cryptographic modifying occurs after the disassembling of the plurality of first datasets into multiple data blocks to form "t" volumes.

38. The method of claim 34, wherein the compressing comprises using a LZ77, PAQ8PX, and/or LZMA(1) algorithm.

39. The method of claim 28, wherein forming each of the plurality of first datasets comprises assigning a filename derived by randomly generating alphanumeric strings to each of the plurality of first datasets.

40. The method of claim 28, further comprising:
cryptographically modifying, with an encryption module of the computing device, each of the t volumes separately.

41. The method of claim 40, further comprising:
assigning, with the encryption module of the computing device, a different key to each of the cryptographically modified t volumes.

42. The method of claim 40, wherein cryptographically modifying each of the t volumes separately comprises using at least two different encryption algorithms so that at least two of the t volumes are cryptographically modified using different encryption algorithms.

43. The method of claim 28, wherein at least two of the first datasets are dispersed in different volumes.

44. The method of claim 28 wherein the dispersal module prioritizes the transmission of the volumes by first transmitting to local storage devices before transmitting the volumes to remote storage locations.

45. The method of claim 28 further comprising retrieving the volumes that are locally stored before retrieving volumes that are remotely stored.

46. The method of claim 28 wherein the dispersal module prioritizes the transmission of the volumes by first transmitting to storage devices to which transit times are shorter before transmitting the volumes to storage locations to which transit times are longer.

47. The method of claim 28 further comprising retrieving the volumes that are retrieved more quickly before retrieving volumes that are retrieved less quickly.

48. The method of claim 28 wherein the plurality of first datasets are not uniform in size.

49. The method of claim 28 wherein the volumes are not uniform in size.

\* \* \* \* \*